(12) United States Patent
Huang et al.

(10) Patent No.: US 8,744,024 B2
(45) Date of Patent: Jun. 3, 2014

(54) CLOCK-DATA RECOVERY WITH NON-ZERO H(−1) TARGET

(75) Inventors: Dawei Huang, San Diego, CA (US);
Deqiang Song, San Diego, CA (US);
Jianghui Su, San Jose, CA (US);
Osman Javed, Sunnyvale, CA (US);
Hongtao Zhang, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 319 days.

(21) Appl. No.: 13/245,533

(22) Filed: Sep. 26, 2011

(65) Prior Publication Data
US 2013/0077723 A1    Mar. 28, 2013

(51) Int. Cl.
*H04L 1/00*    (2006.01)
(52) U.S. Cl.
USPC .......................................................... 375/348
(58) Field of Classification Search
CPC .............................. H04L 7/0054; H04L 7/0062
USPC .......................................................... 375/348
See application file for complete search history.

(56) References Cited

U.S. PATENT DOCUMENTS

| 5,367,540 | A  | * | 11/1994 | Kakuishi et al. | 375/350 |
|-----------|----|----|---------|-----------------|---------|
| 5,517,527 | A  | * | 5/1996  | Yu              | 375/233 |
| 2009/0224806 | A1 | * | 9/2009 | Huang et al. | 327/72 |
| 2010/0080282 | A1 | * | 4/2010 | Zhong et al. | 375/233 |
| 2010/0158177 | A1 | * | 6/2010 | Doblar et al. | 375/354 |
| 2010/0208855 | A1 | * | 8/2010 | Huang et al. | 375/354 |
| 2010/0238993 | A1 | * | 9/2010 | Huang et al. | 375/233 |
| 2010/0284686 | A1 | * | 11/2010 | Zhong | 398/1 |
| 2012/0257652 | A1 | * | 10/2012 | Malipatil et al. | 375/219 |

* cited by examiner

*Primary Examiner* — Juan A Torres
(74) *Attorney, Agent, or Firm* — Park, Vaughan, Fleming & Dowler LLP; Steven E. Stupp (57) ABSTRACT

In a receiver circuit, a node receives a signal that carries data from a transmitter circuit. Moreover, a clock-data-recovery (CDR) circuit in the receiver circuit recovers an at-rate clock signal from the received signal. The CDR circuit recovers the clock signal without converging a first pulse-response precursor of the signal relative to a pulse-response cursor of the signal to approximately zero (e.g., with the first pulse-response precursor h(−1) converged to a non-zero value). Furthermore, the first pulse-response precursor corresponds to at least one precurosor or postcursor of the pulse-response other than the current sample.

19 Claims, 8 Drawing Sheets

CLOCK-DATA RECOVERY WITH NON-ZERO H(−1) TARGET

BACKGROUND

1. Field

The present disclosure generally relates to clocking circuits. More specifically, the present disclosure relates to an at-rate clock-data-recovery (CDR) circuit that recovers a clock signal with a pulse-response precursor h(−1) converged to a non-zero value.

2. Related Art

Clock-data-recovery (CDR) circuits are widely used in serializer/deserializer (SerDes) receiver circuits. These CDR circuits typically use one of two CDR techniques to recover a clock signal from received data. In a first CDR technique (which is sometimes referred to as 'bang-bang CDR'), both data and edge samples are used to extract timing information (either early or late). Thus, the rate of the resulting clock signal is double that of the data rate.

In contrast, the second CDR technique (which is sometimes referred to as 'Muller-Mueller CDR') does not use edge samples; it only uses data samples. Therefore, the rate of the resulting clock signal is the same as the data rate (i.e., the second CDR technique provides at-rate CDR). By avoiding a double-rate clock, the second CDR technique significantly reduces the power consumption.

In existing implementations of the second CDR technique, the CDR convergence condition is to force the last pulse-response precursor h(−1) (which is adjacent to the pulse-response cursor h(0)) to equal the first pulse-response postcursor h(1) (which is also adjacent to the pulse-response cursor h(0)), so that a symmetric pulse response can be obtained. Because h(1) is typically compensated by equalization (such as a linear equalizer or a decision-feedback equalizer), h(1) is often close to zero. Therefore, CDR convergence in this CDR technique usually requires h(−1) to equal zero. For a long communication channel, where precursor intersymbol interference is high, it may be necessary to compensate h(−1), for example, using precompensation in a transmitter circuit or with a feed-forward equalizer in the receiver circuit. However, if the communication channel is very long and/or if the data rate is very high, the precompensation or feed-forward equalization needed to maintain the CDR locking condition may be very large.

Furthermore, when the precompensation is increased, the magnitude of the pulse-response cursor h(0) and, thus, the voltage margin are reduced (i.e., the error rate is typically increased). In addition, a large amount of precompensation may introduce considerable errors in a second pulse-response precursor h(−2). However, applying a correction to h(−2) may further reduce the magnitude of the pulse-response cursor h(0). This recursive effect may even result in an error at a third pulse-response precursor h(−3).

Hence, what is needed is a CDR circuit without the above-described problems.

SUMMARY

One embodiment of the present disclosure provides a receiver circuit. This receiver circuit includes a node that receives a signal that carries data from a transmitter circuit. Moreover, the receiver circuit includes a clock-data-recovery (CDR) circuit that recovers an at-rate clock signal from the received signal. Note that the CDR circuit recovers the clock signal without converging a first pulse-response precursor of the signal relative to a pulse-response cursor of the signal to approximately zero (e.g., with the first pulse-response precursor h(−1) converged to a non-zero value), and the first pulse-response precursor corresponds to at least one precurosor or postcursor of the pulse response other than the pulse-response cursor.

Furthermore, the first pulse-response precursor may immediately precede the pulse-response cursor (i.e., it may be temporally adjacent). In addition, the first pulse-response precursor may include at least a second pulse-response precursor of the signal that precedes the first pulse-response precursor. This second pulse-response precursor may immediately precede the first pulse-response precursor. For example, the second pulse-response precursor may be h(−2), and the first pulse-response precursor may include h(−1) and h(−2).

In some embodiments, the first pulse-response precursor is a product of a multiplier and at least the second pulse-response precursor. For example, the multiplier may include an integer (such as 2). However, more generally, the multiplier may be a real number. Moreover, the first pulse-response precursor may be a sum of the product and a first pulse-response postcursor of the signal relative to the pulse-response cursor.

To reduce the magnitude of the first pulse-response precursor, the data may be precompensated.

Note that a slope as a function of time of the signal at the pulse-response cursor may be approximately zero.

In some embodiments, the receiver circuit includes an equalizer to reduce intersymbol interference associated with pulse-response postcursor samples of the signal relative to the pulse-response cursor.

Another embodiment provides a method for recovering the at-rate clock signal from the signal. During the method, the signal is received. Then, the at-rate clock signal is recovered from the received signal using the CDR circuit, where the CDR circuit recovers the clock signal without converging the first pulse-response precursor of the signal relative to the pulse-response cursor of the signal to approximately zero. Furthermore, the first pulse-response precursor corresponds to at least one precurosor or postcursor of the pulse response other than the pulse-response cursor.

Another embodiment provides a second receiver circuit. This receiver circuit includes a node that receives the signal that carries data from a transmitter circuit. Moreover, the second receiver circuit includes a CDR circuit that recovers an at-rate clock signal from the received signal. Note that the CDR circuit recovers the clock signal by converging a first pulse-response precursor of the signal relative to a pulse-response cursor of the signal to approximately zero, and a phase of the clock signal is adjusted to be late relative to a phase corresponding to when the first pulse-response precursor is zero.

Another embodiment provides an integrated circuit that includes the receiver circuit.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of a receiver circuit, an integrated circuit that includes the receiver circuit, and a method for recovering an at-rate clock signal from a signal using the receiver circuit are described. In the receiver circuit, a node receives a signal that carries data from a transmitter circuit. Moreover, a clock-data-recovery (CDR) circuit in the receiver circuit recovers an at-rate clock signal from the received signal. The CDR circuit recovers the clock signal without converging a first pulse-response precursor of the signal relative to a pulse-response cursor of the signal to approximately zero (e.g., with the first pulse-response precursor h(−1) converged to a non-zero value). Furthermore, the first pulse-response precursor corresponds to at least one precurosor or postcursor of the pulse response other than the pulse-response cursor.

By recovering the clock signal in this manner, the receiver circuit may operate with a lower error rate than existing receiver circuits, thereby improving the performance of a system (such as the integrated circuit) that includes the receiver circuit. In addition, the receiver circuit may reduce the amount of precompensation implemented in the transmitter circuit. Consequently, the receiver circuit may reduce the complexity, size and the power consumption of the transmitter circuit, and thus may reduce the cost of a system that includes the receiver circuit.

We now describe the receiver circuit and the integrated circuit. This receiver circuit implements at-rate CDR. In contrast with existing techniques, the convergence condition does not require that the first pulse-response precursor h(−1) relative to the pulse-response cursor h(0) converge to zero. (In the discussion that follows, convergence to approximately zero should be understood to be less than 5% of the peak signal amplitude or cursor height.) As a consequence, the amount of precompensation in the transmitter circuit (which is sometimes referred to as 'transmitter precursor') or feed-forward equalization in the receiver circuit needed to obtain CDR locking may be significantly reduced or eliminated. This may increase the voltage margin and reduce the error rate for long communication channels and/or high data rates.

Figure 1:
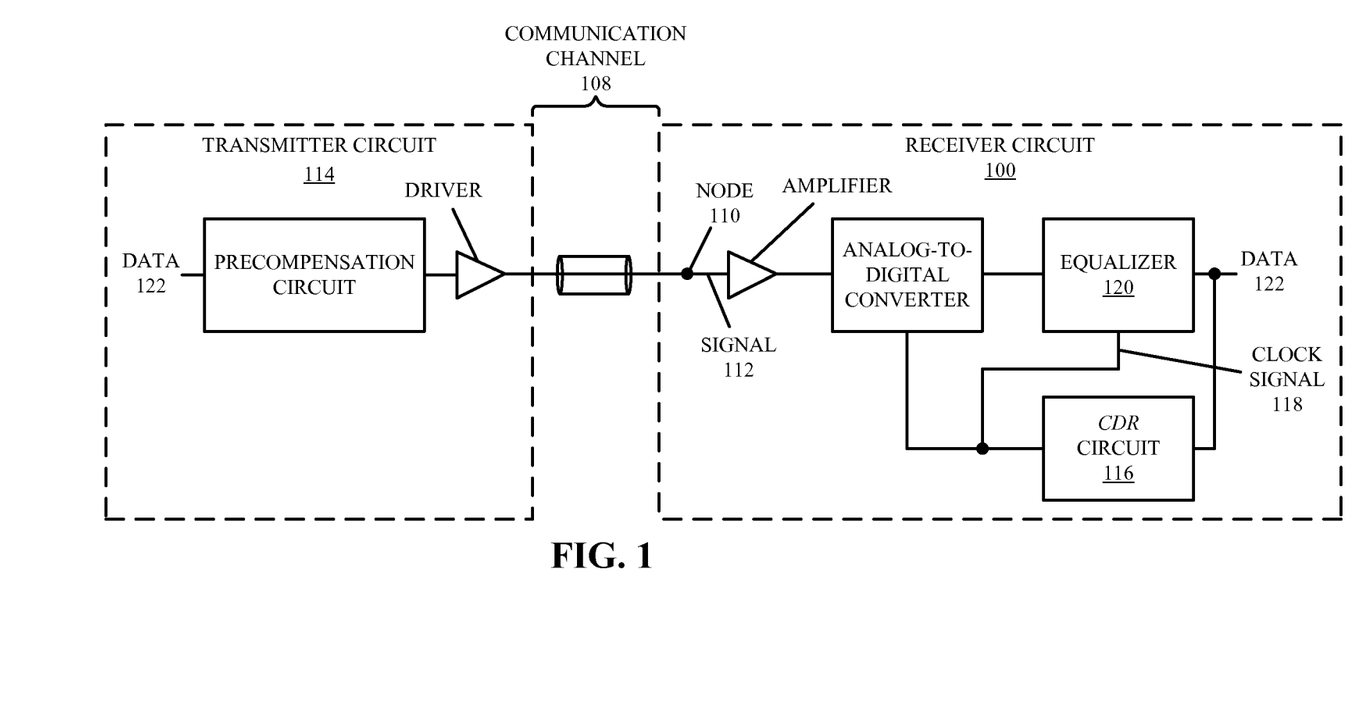
FIG. 1 is a block diagram illustrating a receiver circuit in accordance with an embodiment of the present disclosure.

FIG. 1 presents a block diagram illustrating a receiver circuit 100. This receiver circuit includes a node 110 that receives a signal 112 that carries data 122 from a transmitter circuit 114 via communication channel 108. Moreover, receiver circuit 100 includes a CDR circuit 116 that recovers an at-rate clock signal 118 from received signal 112. Note that CDR circuit 116 recovers clock signal 118 without converging the first pulse-response precursor (such as h(−1)) of signal 112 relative to a pulse-response cursor h(0) of signal 112 to approximately zero or, stated differently, with the first pulse-response precursor h(−1) converged to a non-zero value, and the first pulse-response precursor corresponds to at least one precurosor or postcursor of signal 112 other than the pulse-response cursor h(0).

Furthermore, the first pulse-response precursor (in particular, h(−1)) may immediately precede the pulse-response cursor h(0) (i.e., it may be temporally adjacent). In addition, the first pulse-response precursor may include at least a second pulse-response precursor of signal 112 that precedes the first pulse-response precursor. This second pulse-response precursor may immediately precede the first pulse-response precursor (thus, the second pulse-response precursor may be h(−2), and the first pulse-response precursor may include h(−1) and h(−2)).

In some embodiments, the first pulse-response precursor is a product of a multiplier k and at least the second pulse-response precursor h(−2). For example, the multiplier k may include an integer (such as 2). However, more generally, the multiplier k may be a real number. Moreover, the first pulse-response precursor may be a sum of the product and a first pulse-response postcursor h(1) of signal 112 relative to the pulse-response cursor h(0).

Figure 2:
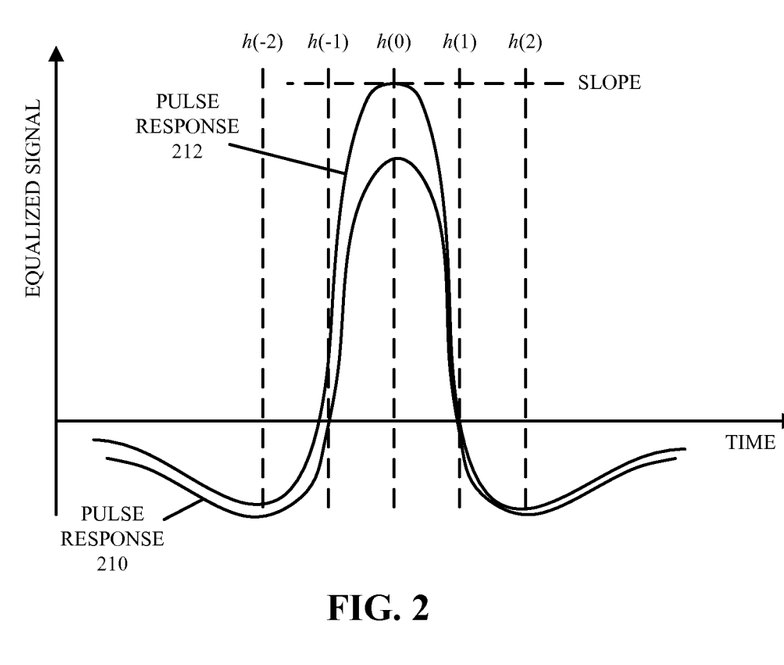
FIG. 2 is a drawing illustrating pulse responses in accordance with an embodiment of the present disclosure.

As shown below with reference to FIG. 2, note that a slope as a function of time of signal 112 at the pulse-response cursor h(0) may be approximately zero.

In some embodiments, receiver circuit 100 includes an equalizer 120 (such as a feed-forward or feedback equalizer, which may be implemented using a finite-impulse response filter) to reduce intersymbol interference associated with pulse-response postcursors of signal 112 relative to the pulse-response cursor h(0). In these embodiments, the first pulse-response precursor may correspond or may be proportional to the product because the first pulse-response postcursor h(1) may be approximately zero.

To reduce the magnitude of the first pulse-response precursor (such as h(−1)), the data may include precompensation, which is implemented by transmitter circuit 114. However, the amount of precompensation may be less than is used with a bang-bang CDR technique. Consequently, recursive errors at other precurosors or postcursors may be reduced or eliminated, with a commensurate impact on: the magnitude of the pulse-response cursor h(0) (which is sometimes referred to as the 'cursor height'), the voltage margin, and the error rate.

In an exemplary embodiment, the convergence equation for CDR circuit 116 may be $$h(-1)-h(1)=-k \cdot h(-2). \tag{1}$$

This non-zero Muller-Mueller CDR technique may lock clock signal 118 to a position later than a zero Muller-Mueller CDR technique (i.e., later than the position with h(−1) equal to zero). At this CDR location, both h(−1) and h(−2) are non-zero. Note that h(−1) is typically positive because of dispersion in the communication channel 108 (such as a link or signal line). Moreover, h(−2) is typically negative as a result of precompensation in transmitter circuit 114 that is used to compensate h(−1). Note that, for a given communication channel, multiplier k can be calculated or experimentally determined to control the exact CDR convergence location. However, for ease of implementation, multiplier k may be an integer, such as 2.

As an illustrative example, we now describe simulations of the aforementioned CDR technique (which is sometimes referred to as a 'non-zero Muller-Mueller CDR technique'). The results of these simulations have improved performance relative to the zero Muller-Mueller CDR technique. In particular, with an equalizer having a partial response target (such as 1-D), the voltage margin and eye opening are increased. For example, with the zero Muller-Mueller CDR technique the voltage margin may be 42.6 mV. As shown in FIG. 2, which presents a drawing illustrating pulse responses 210 and 212 (for the zero Muller-Mueller CDR technique and the non-zero Muller-Mueller CDR technique, respectively), this may require a larger precursor or precompensation (for example, −17.5%) to lock the clock signal to the center of the pulse response. However, if the precursor is reduced to −10%, the zero Muller-Mueller CDR technique does not lock to the center of the pulse response, even though the voltage margin improves to 47.7 mV. In contrast, when the non-zero Muller-Mueller CDR technique is used, a smaller precursor (such as −10%) can be used, and the CDR circuit maintains lock to the center of pulse response. In this case, the voltage margin is improved to 58.3 mV, a 22% increase.

Figure 3A:
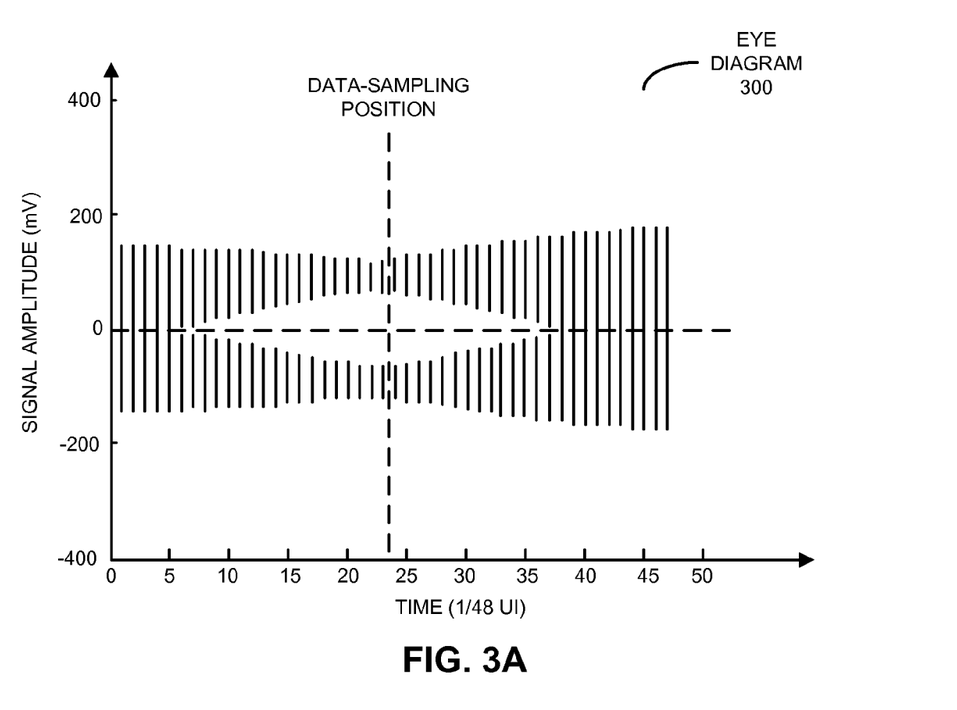
FIG. 3A is a drawing illustrating an eye diagram in accordance with an embodiment of the present disclosure.
Figure 3B:
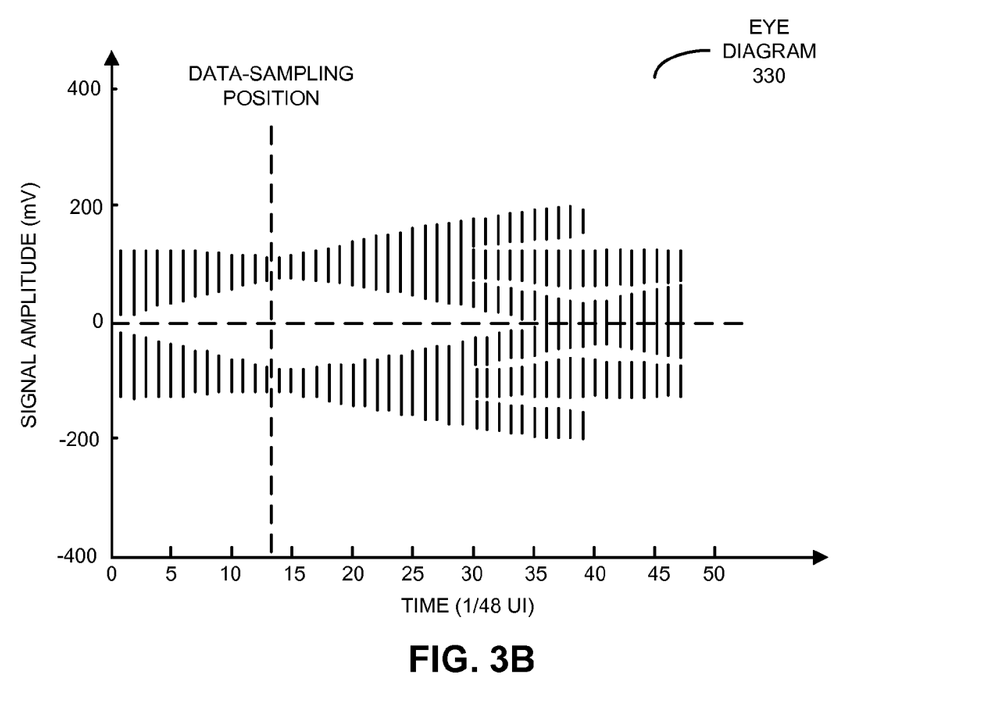
FIG. 3B is a drawing illustrating an eye diagram in accordance with an embodiment of the present disclosure.
Figure 3C:
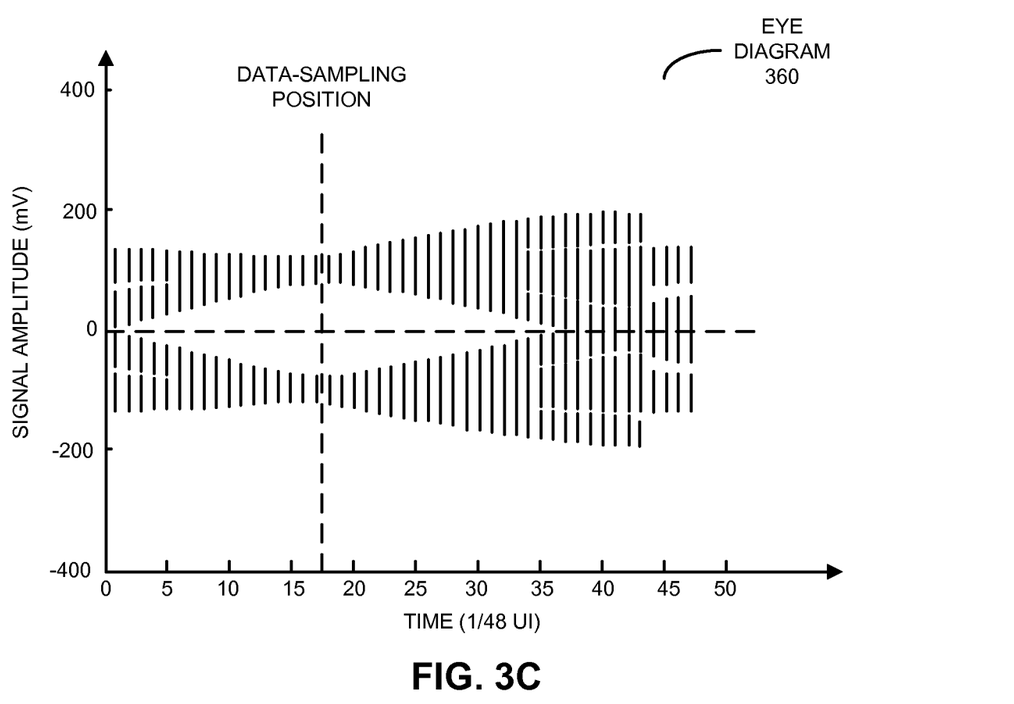
FIG. 3C is a drawing illustrating an eye diagram in accordance with an embodiment of the present disclosure.

As shown in FIGS. 3A-C, which present drawings illustrating an eye diagram 300 for the zero Muller-Mueller CDR technique, an eye diagram 330 for the zero Muller-Mueller CDR technique with precompensation, and an eye diagram 360 for the non-zero Muller-Mueller CDR technique, in additional circuit simulation, with a communication channel having a 23 dB loss at 16 Gbps, the non-zero Muller-Mueller CDR technique can increase the eye opening by 6% (from 82 mV to 86.6 mV). In these simulations, the CDR circuit implementation was based on error signals that are used to calculate the statistically optimal point for Eqn. 1. Moreover, at each data symbol, $h(1)$ and $h(-1)+2 \cdot h(-2)$ are compared. If $h(1)$ is greater, then an early vote is generated; if $h(1)$ is smaller, a late vote is generated. Then, early and late votes are accumulated for a voting window (such as 1024 bits). Moreover, an inc (or a dec) signal is generated to increase (or decrease) the CDR phase code.

Referring back to FIG. 1, in another embodiment of receiver circuit 100 CDR circuit 116 recovers an at-rate clock signal 118 from received signal 112 by converging a first pulse-response precursor (in particular, $h(-1)$) of signal 112 relative to a pulse-response cursor $h(0)$ of signal 112 to zero or approximately zero (i.e., CDR circuit 116 may implement the zero Muller-Mueller CDR technique). However, in contrast with the zero Muller-Mueller CDR technique, a phase of clock signal 118 is adjusted to be late relative to a phase corresponding to when the first pulse-response precursor $h(-1)$ is zero. In this way, clock signal 118 may be locked to a position that is equivalent to that achieved in the previous embodiment of receiver circuit 100.

In summary, a CDR circuit in a receiver circuit has been described. This CDR circuit implements an at-rate CDR convergence equation where $h(-1)$ is not converged to approximately zero, and where the converged $h(-1)$ value is controlled by $h(-2)$ and/or other $h(i)$ values. Alternatively, the CDR circuit may implement an at-rate CDR convergence equation where $h(-1)$ is converged to approximately zero, and the clock signal may be locked intentionally late. Either of these CDR techniques may be useful for long communication channels and/or at high data rates.

Figure 4:
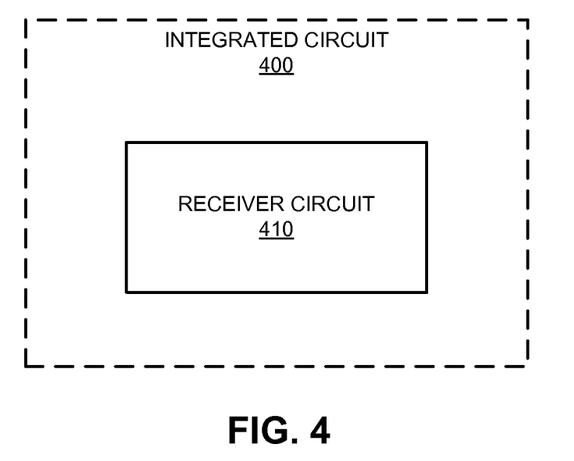
FIG. 4 is a block diagram illustrating an integrated circuit that includes the receiver circuit in FIG. 1 in accordance with an embodiment of the present disclosure.

FIG. 4 presents a block diagram illustrating an integrated circuit 400 that includes a receiver circuit 410, such as one of the embodiments of receiver circuit 100 (FIG. 1). This integrated circuit may be used in a variety of applications, including: VLSI circuits, communication systems, storage area networks, data centers, networks (such as local area networks), memory components (such as those that include a high I/O count), electronic devices, memory systems, and/or computer systems (such as multiple-core processor computer systems, computer systems that include components that communicate via capacitive proximity communication, computer systems that include components that communicate via optical proximity communication, etc.). Note that the computer systems may include, but are not limited to: a server, a laptop computer, a communication device or system, a personal computer, a work station, a mainframe computer, a blade, an enterprise computer, a data center, a portable-computing device, a tablet computer, a supercomputer, a network-attached-storage (NAS) system, a storage-area-network (SAN) system, and/or another electronic computing device. Moreover, note that a given computer system may be at one location or may be distributed over multiple, geographically dispersed locations.

Receiver circuit 100 (FIG. 1) may include fewer components or additional components. Although these embodiments are illustrated as having a number of discrete items, these circuits and devices are intended to be functional descriptions of the various features that may be present rather than structural schematics of the embodiments described herein. Consequently, in these embodiments two or more components may be combined into a single component, and/or a position of one or more components may be changed. Furthermore, note that circuits in these embodiments may be implemented using PMOS and/or NMOS, and signals may include digital signals that have approximately discrete values and/or analog signals that have continuous values.

Figure 5:
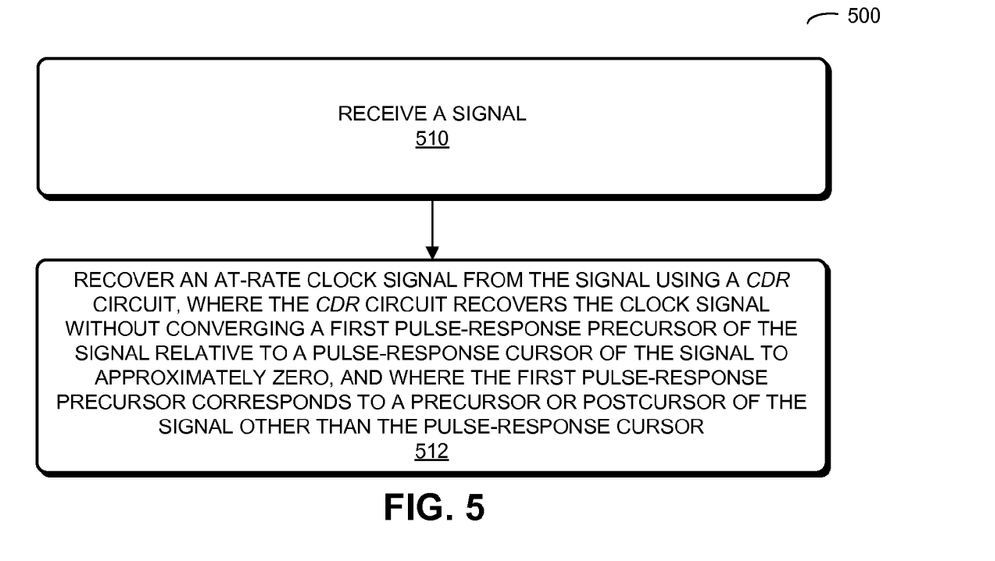
FIG. 5 is a flow chart illustrating a method for recovering an at-rate clock signal from a signal using the receiver circuit of FIG. 1 in accordance with an embodiment of the present disclosure.

We now describe embodiments of the method. FIG. 5 presents a flow chart illustrating a method 500 for recovering an at-rate clock signal from a signal using receiver circuit 100 (FIG. 1) with the non-zero Muller-Mueller CDR technique. During this method, the signal is received (operation 510). Then, the at-rate clock signal is recovered from the received signal using the CDR circuit, where the CDR circuit recovers the clock signal without converging the first pulse-response precursor of the signal relative to the pulse-response cursor of the signal to approximately zero. Furthermore, the first pulse-response precursor corresponds to at least one sample of the signal other than the pulse-response cursor (operation 512).

Figure 6:
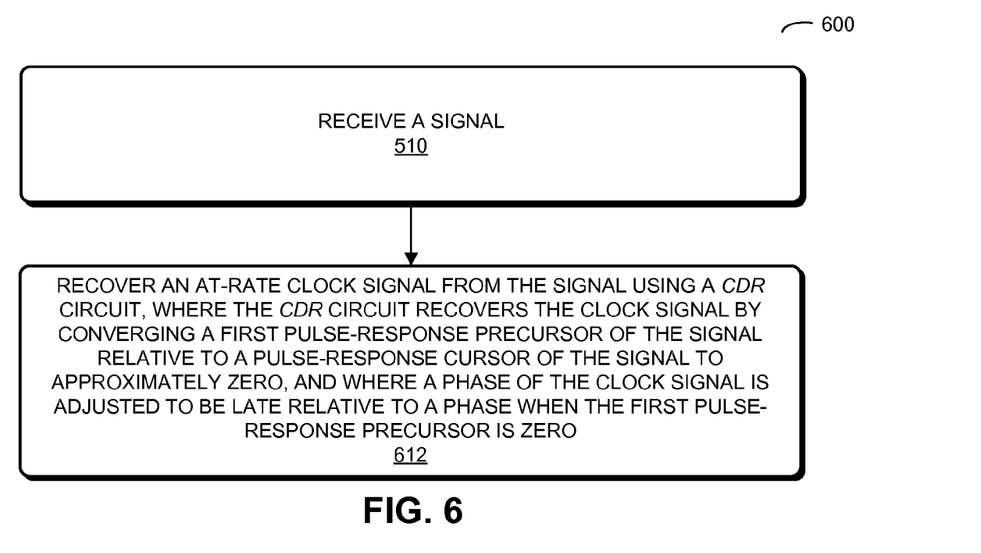
FIG. 6 is a flow chart illustrating a method for recovering an at-rate clock signal from a signal using the receiver circuit of FIG. 1 in accordance with an embodiment of the present disclosure.

FIG. 6 presents a flow chart illustrating a method 600 for recovering an at-rate clock signal from a signal using receiver circuit 100 (FIG. 1) with the modified zero Muller-Mueller CDR technique in which the phase of the recovered clock signal is late. During this method, the signal is received (operation 510). Then, the at-rate clock signal is recovered from the received signal using the CDR circuit, where the CDR circuit recovers the clock signal by converging a first pulse-response precursor of the signal relative to a pulse-response cursor of the signal to approximately zero. Furthermore, a phase of the clock signal is adjusted to be late relative to a phase corresponding to when the first pulse-response precursor is zero (operation 612).

In some embodiments of methods 500 (FIG. 5) and 600, there are additional or fewer operations. Moreover, the order of the operations may be changed, and/or two or more operations may be combined into a single operation.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A receiver circuit, comprising:
a node configured to receive a signal, carrying data, from a transmitter circuit; and
a clock-data-recovery (CDR) circuit configured to recover an at-rate clock signal from the received signal, wherein the CDR circuit is configured to recover the clock signal without converging a first pulse-response precursor of the signal relative to a pulse-response cursor of the signal to approximately zero; and
wherein the first non-zero pulse-response precursor corresponds to at least one precursor of the pulse response other than the pulse-response cursor.

2. The receiver circuit of claim 1, wherein the first pulse-response precursor immediately precedes the pulse-response cursor.

3. The receiver circuit of claim 1, wherein the first pulse-response precursor additionally includes at least a second pulse-response precursor of the signal that precedes the first pulse-response precursor.

4. The receiver circuit of claim 1, wherein the data is precompensated to reduce a magnitude of the first pulse-response precursor.

5. The receiver circuit of claim 1, wherein a slope as a function of time of the signal at the pulse-response cursor is approximately zero.

6. The receiver circuit of claim 1, further comprising an equalizer to reduce intersymbol interference associated with pulse-response postcursors of the signal relative to the pulse-response cursor.

7. The receiver circuit of claim 3, wherein the second pulse-response precursor immediately precedes the first pulse-response precursor.

8. The receiver circuit of claim 3, wherein the first pulse-response precursor is a product of a multiplier and at least the second pulse-response precursor.

9. The receiver circuit of claim 8, wherein the multiplier includes an integer.

10. The receiver circuit of claim 8,
wherein the first pulse-response precursor is a sum of the product and a first pulse-response postcursor of the signal relative to the pulse-response cursor.

11. A method for recovering an at-rate clock signal from a signal, carrying data, wherein the method comprises:
receiving the signal; and
recovering the at-rate clock signal from the received signal using a CDR circuit, wherein the CDR circuit recovers the clock signal without converging a first pulse-response precursor of the signal relative to a pulse-response cursor of the signal to approximately zero; and
wherein the first non-zero pulse-response precursor corresponds to at least one precursor of the pulse response other than the pulse-response cursor.

12. The method of claim 11, wherein the first pulse-response precursor immediately precedes the pulse-response cursor.

13. The method of claim 11, wherein the first pulse-response precursor additionally includes at least a second pulse-response precursor of the signal that precedes the first pulse-response precursor.

14. The method of claim 13, wherein the second pulse-response precursor immediately precedes the first pulse-response precursor.

15. The method of claim 13, wherein the first pulse-response precursor is a product of a multiplier and at least the second pulse-response precursor.

16. The method of claim 13, wherein the data is precompensated to reduce a magnitude of the first pulse-response precursor.

17. The method of claim 13, wherein a slope as a function of time of the signal at the pulse-response cursor is approximately zero.

18. The method of claim 13, wherein the method further comprises equalizing the signal to reduce intersymbol interference associated with pulse-response postcursors of the signal relative to the pulse-response cursor.

19. The method of claim 15, wherein the multiplier includes an integer.

* * * * *

UNITED STATES PATENT AND TRADEMARK OFFICE
CERTIFICATE OF CORRECTION

| | | |
|---|---|---|
| PATENT NO. | : 8,744,024 B2 | Page 1 of 1 |
| APPLICATION NO. | : 13/245533 | |
| DATED | : June 3, 2014 | |
| INVENTOR(S) | : Huang et al. | |

It is certified that error appears in the above-identified patent and that said Letters Patent is hereby corrected as shown below:

Title Page, Item (57) Abstract, line 10, delete "precurosor" and insert -- precursor --, therefor.

In the Specification

In column 2, lines 3-4, delete "precurosor" and insert -- precursor --, therefor.

In column 2, line 40, delete "precurosor" and insert -- precursor --, therefor.

In column 3, line 31, delete "precurosor" and insert -- precursor --, therefor.

In column 4, line 2, delete "precurosor" and insert -- precursor --, therefor.

In column 4, line 39, delete "precurosors" and insert -- precursors --, therefor.

Signed and Sealed this
Ninth Day of December, 2014

Michelle K. Lee
*Deputy Director of the United States Patent and Trademark Office*